United States Patent Office 3,549,260
Patented Dec. 22, 1970

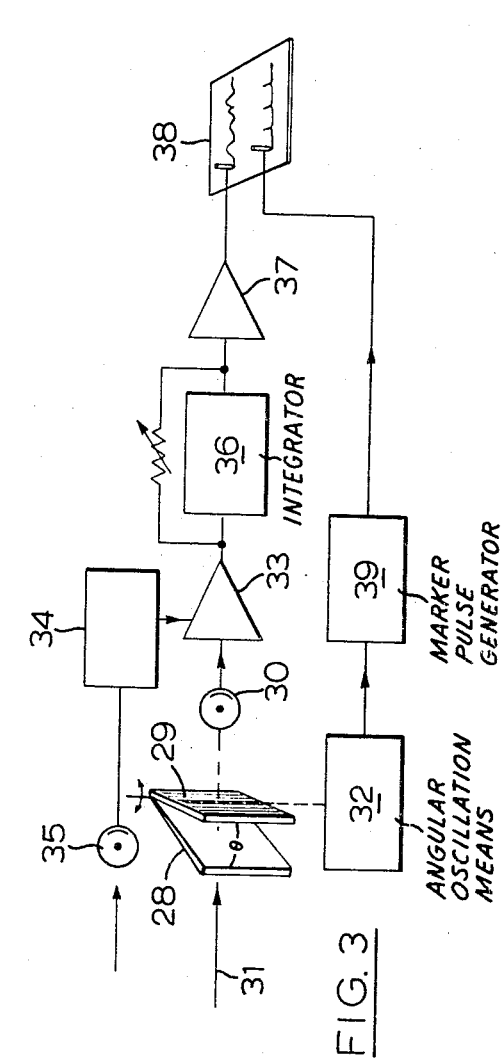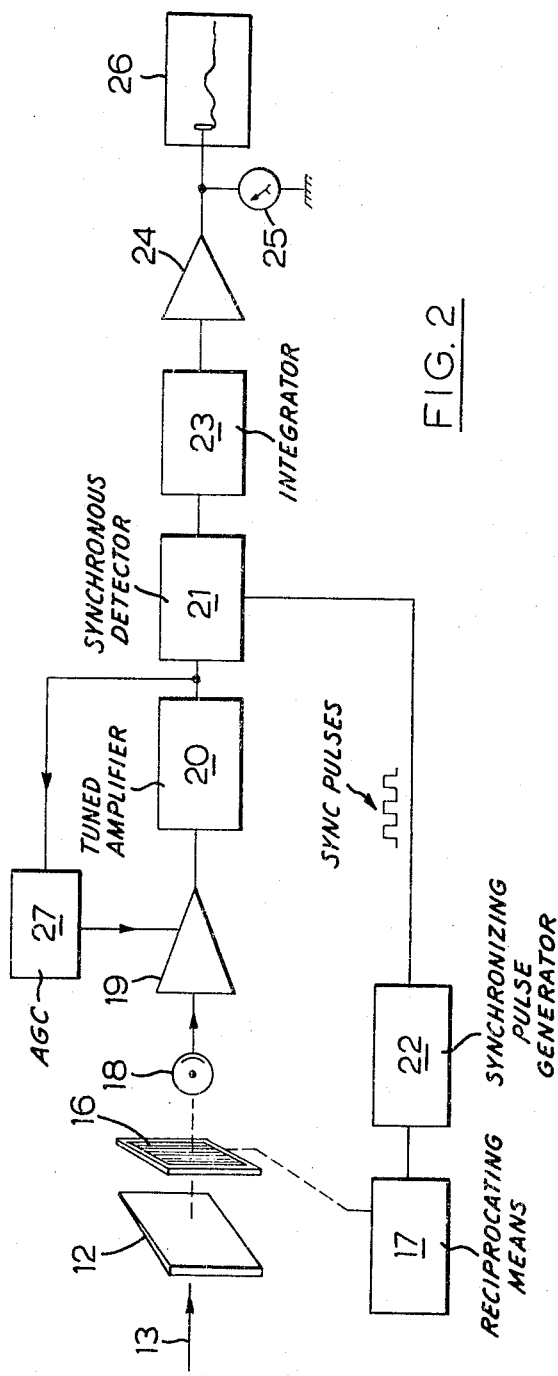

3,549,260
SPATIALLY DISPERSIVE CORRELATION INTERFEROMETER
Anthony Rene Barringer, Willowdale, Ontario, Canada, assignor to Barringer Research Limited, Rexdale, Ontario, Canada, a corporation
Filed Jan. 8, 1968, Ser. No. 696,165
Claims priority, application Great Britain, Jan. 10, 1967, 1,231/67
Int. Cl. G01b 9/02
U.S. Cl. 356—112                          15 Claims

ABSTRACT OF THE DISCLOSURE

An interferometer having an interferometric element such as a wedge for producing spatially dispersed fringes in light incident upon the wedge. A photographic mask having a pattern of lines corresponding to the pattern of fringes produced in light of known spectral content (e.g. light containing $SO_2$ absorption spectra) is positioned in the plane where the fringes are imaged, and a photodetector is positioned to receive light which has passed through the mask. Means is provided for sweeping the fringes back and forth across the lines of the mask, and the existence of correlation is indicated electronically.

---

This invention relates to the art of interferometry and in particular to a scanning interferometer.

This invention is related to an invention disclosed in co-pending United States application Ser. No. 683,396 filed Nov. 14, 1967 of Barringer Research Limited. The above application discloses a scanning interferometer based on the Michelson interferometer, and its principle of operation may be summarized as follows. Light entering the interferometer (incident light) is split into two beams which are recombined to form interference fringes. Means is provided for cyclically varying the path length difference of the two beams so that light emerging from the interferometer (emergent light) varies in intensity as a function of time in accordance with the formula $$I(t) = \int_0^\infty I(\lambda) \cos^2 \frac{2\pi \beta(t)}{\lambda} \alpha \lambda$$

where $\beta$ is the path length difference at time $t$, and $I(\lambda)$ is the intensity of the incident light at different wavelengths $\lambda$. The interferometer is provided with spectrum characterizing means, such as a photographic mask having a series of opaque lines that uniquely define either a particular monochromatic wavelength or else a particular complex spectrum, e.g. that of $SO_2$ gas. The spectrum characterizing means is synchronized with the path length varying means, and the presence of a particular monochromatic wavelength or of a particular complex spectrum in the incident light is indicated by electronically correlating signals derived from the spectrum characterizing means with signals derived from the emergent light.

Instead of using a Michelson configuration, the present invention uses a simple optical wedge to form interference or Fizeau fringes. The fringes constitute a transform (apparently a super-position of Fourier transforms) of the spectral content of the incident light, and the fringes are stationary and not time varying as in the case of the invention disclosed in the co-pending application referred to above. An interferometer constructed in accordance with the present invention is comparatively simple to construct, stable, and has a comparatively large light throughput.

According to one aspect, the invention consists of an optical wedge adapted to produce interference fringes when light is incident upon it, a mask having a plurality of relatively opaque and transparent lines, said lines being correlative with a set of fringes which correspond to the characteristic spectra of a particular substance, said mask being positioned in a plane where said fringes are focused, means for cyclically varying the degree of correlation between the fringes and the lines of the mask at a rapid and constant rate of repetition between a first condition wherein the fringes correlate with the lines of the mask and a second condition wherein there is substantially less correlation than in the first condition, so that the intensity of the light passing through the mask is cyclically varied from one level at said first condition to another level at said second condition when said characteristic spectra are present in the light, whereby the photodetector produces an output signal containing an alternating current component attributable to the existence of said characteristic spectra in the light, and means for analyzing the output of the photodetector to provide an indication of the existence of said characteristic spectra in the incident light.

Preferred embodiments of the invention are illustrated in the accompanying drawings, wherein:

FIG. 1 is a diagrammatic view of a wedge used for producing fringes,

FIG. 2 is a diagrammatic view showing the principal optical and electronic components of one embodiment of the invention, FIG. 3 is a diagrammatic view similar to FIG. 2 of another embodiment of the invention.

Figure 4:
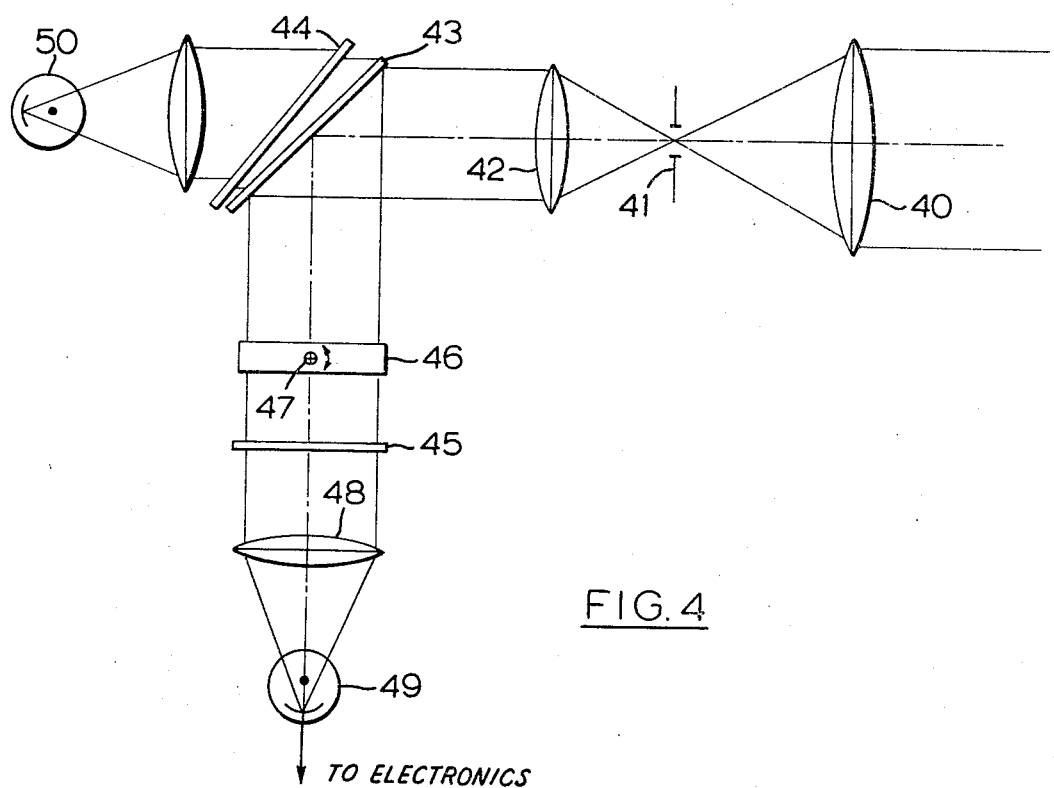
FIG. 4 is a diagrammatic view similar to FIG. 2 of yet another embodiment of the invention.

Referring to FIG. 1, a pair of thin transparent plates 10 and 11 form a wedge shaped air space 12 (hereafter called the wedge) defined by a small angle $\alpha$. A light beam represented by arrow 13 is incident upon the plate 10 and it suffers interference as it passes through the plates 10 and 11. Chain dotted lines 14 and 15 respectively represent the loci of interference fringes produced by transmission and reflection of the incident light. The fringes consist of lines that are parallel to joining edge 12a of the wedge 12 (i.e. they are perpendicular to the paper, as viewed in FIG. 1). The fringes characterize the spectral content of the light which produces them. Monochromatic light produces a series of uniformly spaced fringes (the spacing depending on frequency) of equal intensity, whereas light having a complex spectral content produces a more complex intensity variation. Zero order fringes appear near the joining line 12a of the wedge 12, and higher order fringes appear at progressively further distances from the joining line 12a. The fringes characterize the spectral content of the light which produces them. $NO_2$ gas, for example, has a complex absorption spectrum in the range between about 4000–6000 A. When the incident light contains the characteristic absorption spectrum of $NO_2$, a series of fringes that is characteristic of $NO_2$ gas (and of no other gas) is produced by the wedge 12.

Referring now to FIG. 2, an incident beam of light 13 passes through the wedge 12 where it suffers interference resulting in the production of fringes. A mask 16 is located at or near the locus of the transmitted fringes, and it consists of a piece of photographic film having a series of opaque line as described above. The film is contained in any suitable frame or holder. The mask 16 is formed by exposing a piece of photographic film to the fringes produced by the wedge 12 when light containing a particular absorption or emission spectrum of interest is caused to shine through the wedge 12 and thereby expose the film.

For example, in order to make a mask for NO₂ gas, incident light obtained from a broad band source is shone through a cell containing NO₂ gas, so that light emerging from the cell is of reduced intensity at wavelengths defined by the absorption spectrum of NO₂ gas. The fringes so produced are uniquely characteristic of NO₂ gas, and therefore the series of lines on the mask 16 (which constitute an image of the fringes) is also characteristic of NO₂ gas. The mask 16 is oriented at right angles to the beam of light passing through it and is vibrated to and fro by means of reciprocating means 17, such as a tuning fork or the like. As the mask is vibrated, the lines on the mask and the fringes produced by the wedge 12 are periodically aligned, assuming that the particular spectrum corresponding to the lines on the mask is present in the incident light. Accordingly, the light passing through the mask is modulated due to the periodic alignment of the lines on the mask and the fringes. If the displacement of the mask 16 is equal to the width of only one fringe, the light passing through the mask 16 will be modulated at the vibration frequency of the mask 16 (fundamental frequency). Although optimum correlation occurs when the lines on the mask 16 are exactly aligned with the fringes, it has been found that in the case of some substances (e.g. NO₂) that reasonably good correlation occurs when the lines on the mask 16 are shifted over by one or two fringes on either side of the optimum correlation position. In other words, a high degree of correlation may occur not only at the optimum position (when the lines on the mask 16 are exactly aligned with the fringes) but also when the mask 16 is shifted over by one or two fringes on either side of the optimum correlation position. Thus the light passing through the mask 16 may be modulated by frequencies that are exact harmonics of the fundamental frequency, as well as by the fundamental frequency. The number of harmonic frequencies depends upon the number of fringes that are swept per cycle, which depends upon the amplitude of displacement of the mask 16. The A.C. modulation produced in the manner described above is attributable to the fact that, in the position where the fringes correlate with the lines of the mask, either a minimum or a maximum amount of light is permitted to pass through. When the fringes are displaced from the optimum correlation position, the intensity of the light transmitted through the mask changes. The optimum amplitude of displacement of the fringes relative to the lines on the mask depends upon the particular spectrum being analyzed. With fringes that are reasonably regularly spaced it is possible to sweep through, say two fringes on either side of the optimum correlation position and thereby produce A.C. signals at harmonics of the frequency of the reciprocating means 17. Thus, in this case, the amplitude of the displacement is about twice the peak to peak spacing of the fringes. In the case of irregularly spaced fringes, the optimum displacement is of the order of one half the average peak to peak spacing of the fringes. It is possible to determine the optimum displacement mathematically by cross-correlation function analysis, or else experimentally by varying the amplitude of displacement until the best A.C. signal is produced.

The frequency of vibration is preferably as high as possible, the upper frequency limit essentially being fixed by the inertia of the moving parts. In a prototype of the present interferometer, it was found convenient to use a frequency of about 60 c.p.s.

The light passing through the mask 16 is detected by a photodetector 18 such as a photomultiplier tube or any like photosensitive device, and the output of the photodetector 18 is fed to a preamplifier 19. The output of the photodetector 18 consists of a D.C. component proportional to the intensity of the incident light and an A.C. component when the lines on the mask 16 correlate with the fringes produced by the wedge 12. The A.C. component includes at least a fundamental frequency component (equal to the vibration frequency of the mask 16) and harmonics as well if two or more fringes are swept per cycle. The output of the preamplifier 19, which is of conventional design, is connected to the input of an amplifier 20 that is tuned to the vibration frequency of the mask 16 or to a harmonic thereof, depending on the number of fringes swept per cycle. In some cases a fairly large signal may occur at the fundamental frequency due to electrical noise, vignetting and other optical effects unrelated to the correlation effects discussed above. Such signals are undesirable as they tend to obscure the correlation signals, but in many cases they can be eliminated by sweeping the mask 16 over two or more fringes and tuning the amplifier 20 to an appropriate harmonic frequency. The output of the amplifier 20 is connected to one input of a synchronous detector 21 that is synchronized with the reciprocating means 17 by means of a conventional synchronizing pulse generator 22. The synchronizing pulse generator 22 is adapted to produce a series of stable periodic square waves of the fundamental frequency or of a predetermined harmonic frequency, and its output is connected to the synchronous detector 21. The frequency of the square waves produced by the synchronizing pulse generator 22 is controlled by an A.C. signal which is derived in a known manner from the tuning fork or other reciprocating means. For example, this may be accomplished by means of an additional photographic mask (having a series of uniformly spaced lines) attached to the tuning fork, together with a small lamp arranged to shine through the mask and onto the sensitive face of a photodetector. The output of the photodetector then is locked to the motion of the tuning fork, and after suitable amplification the output of the photodetector provides a synchronizing signal for controlling the synchronizing pulse generator 22.

The output of the synchronous detector 21 consists of a D.C. voltage proportional to the intensity of the light shining through the mask 16 and to the level of the A.C. modulation components occurring when the lines on the mask correlate with the fringes produced by the wedge 12, as described above. The synchronous detector 21 is fed to a conventional integrator 23 which integrates to zero any random noise components present in the output of the synchronous detector 21. The output of the integrator 23 is amplified by a conventional output amplifier 24 and the level of the output of the amplifier 24 is indicated by a meter 25 or any other suitable recording or display means 26. The level of the voltage indicated by the meter 25 or the display means 26, when compensated for changes in ambient intensity of the incident light, is indicative of the intensity of the spectra correlating with the lines on the mask.

Compensation for varying levels of incident light intensity is provided by means of any conventional automatic gain control (AGC) circuit 27 which is connected to the preamplifier 19 and which is adapted to vary the gain thereof in accordance with variations in the level of the D.C. component at the input of the synchronous detector from the level of a predetermined fixed reference D.C. level developed in the AGC circuit 27.

The plates 10 and 11 which are used to form the wedge 12 may be provided with semi-reflecting (e.g. half-silvered) surfaces 10a and 11a to increase the contrast of the fringes. The wedge 12 can be made by separating the plates 10 and 11 with a piece of mylar tape or the like at one end and then cementing them together. The size of the angle α determines the separation of the fringes produced by the wedge 12. If it is desired to correlate only with fringes removed by a certain distance from the zero order fringes, it is merely necessary to separate the plates 10 and 11 at both ends, while maintaining the predetermined angle α between them. It will be understood that the wedge can be made by other conventional means, and that the wedge need not necessarily be of air.

It has been found convenient for mechanical reasons to arrange the wedge 12 so that the incident light makes an angle of about 45° with it, although this is not at all critical. If the incident light is normal or close to normal to the wedge 12, the fringes are either in the wedge 12 or close to it, and lenses might be required for imaging the fringes at a more convenient place. However, it should be understood that as the angle between the incident light and the normal to the wedge faces is increased, the angular size of the incident beam must be decreased if a given level of fringe contrast is to be maintained.

In the embodiment described above, the wedge 12 is fixed and the mask 16 is vibrated transversely. A number of alternative arrangements could be employed without departing from the invention. For example, the mask 16 can be angularly oscillated about an axis perpendicular to the plane of the mask 16 so that the fringes cross the lines on the mask 16 except at one position during the motion of the mask 16. In addition, the wedge 12 can be reciprocated transversely or angularly oscillated instead of the mask 16. Furthermore, although the embodiment described above utilizes the fringes that are transmitted through the wedge 12, it will be understood that the corresponding reflection fringes (located along line 15 in FIG. 1) could be used instead, with appropriate changes in the geometry of the interferometer. In this case, surface 11a of the wedge 12 can be made completely reflecting.

From the description above it will be understood that the invention can be used for identifying individual monochromatic wavelengths present in the incident light or else to identify a particular complex spectrum, e.g. $SO_2$, $NO_2$, or the like. Thus the invention has application in air pollution studies, for example, as it can be used for remotely sensing the level of noxious fumes such as $SO_2$ or $NO_2$ issuing from smokestacks, or in general the level of such pollutants in the atmosphere. However, if it is desired to perform a conventional spectrum analysis of the incident light (as opposed to identifying a particular spectrum) the embodiment in FIG. 3 is used.

As indicated in the description above, when monochromatic light is incident upon the wedge, a series of uniformly spaced fringes is produced. For every monochromatic wavelength, assuming the angle $\alpha$ is constant, the fringes have a unique spacing that characterizes the particular wavelength. As the wavelength is increased, the spacing between the fringes increases and similarly as the wavelength is decreased the spacing between the fringes decreases. Conversely, assuming a mask contains a given spacing of equi-spaced lines, the lines of the mask will correlate with a particular narrow wavelength band of light, the bandwidth depending, inter alia, on the spacing of the lines. Therefore if the spacing of the lines is varied in a periodic manner, different wavelengths will pass preferentially through the mask and report to the photodetector as the spacing of the lines is varied. A convenient method of changing the effective spacing of the lines is to angularly oscillate the wedge 12 about its apex. When this is done, the fringes "see" a different spacing of lines on the mask as the wedge rotates. At one limit of travel of the wedge, the lines on the mask have a maximum effective spacing, and the longest wavelengths present in the incident light will report to the photodetector. At the other limit of travel, the effective spacing of the lines is a minimum, and the shortest wavelengths will report to the photodetector. Accordingly, the spectrum of the incident light can therefore effectively be scanned in this manner.

In FIG. 3 a wedge 28, a mask 29 and a photodetector 30 (which are respectively similar to the wedge 12, mask 16 and photodetector 18) are aligned in the same manner as in the embodiment of FIG. 1. In this case, however, the lines of the mask 16 are uniformly spaced. Light of unknown spectral composition is incident upon the wedge 28 and is indicated by arrow 31. Angular oscillation means 32, such as a torsional chopper energized by any conventional drive circuit, is coupled to the wedge 28 and is adapted to angularly oscillate the wedge 28 through a predetermined angle, the rotation of the wedge 28 being governed by a periodic predetermined law of motion (see below). The output of the photodetector 30 consists of a slowly fluctuating D.C. voltage, one part of which is attributable to non-correlating light passing through the mask 29 and the other of which is attributable to light at wavelengths correlating with the lines on the mask 29. The first part referred to above (non-correlating light) is not appreciably modulated by the motion of the wedge 28, whereas the other part is modulated in accordance with the spectrum of the incident light. The output of the photodetector 30 is fed to a conventional preamplifier 33 the gain of which is controlled by a conventional AGC circuit 34. In order to compensate for random changes in the intensity of the incident light, which otherwise might lead to false measurements, the incident light is sampled by a second photodetector 35, and the output of the photodetector 35 is fed to the AGC circuit 34 where it is amplified and compared with a fixed reference D.C. voltage. Any deviations in the intensity of the incident light from normal result in the gain of the preamplifier 33 being varied accordingly.

The output of the preamplifier 33 is fed to an integrator 36 having an adjustable time constant so that it can be set to a value consistent with the frequency of rotation of the wedge 28. The output of the integrator 36 is connected to a low pass output amplifier 37 having a high frequency cut-off frequency of, for example, 10 c.p.s. for filtering random A.C. noise. The amplifier 37 drives one channel of a pen recorder 38 or like recording or display means, and the curve produced by the recorder 38 represents the spectrum of the incident light. In order to have a linear wavelength base for the curve, the motion of the wedge 28 should be such that the rate of change of $\sin \theta$ is constant, where $\theta$ is the angle between the wedge 28 and the direction of the incident light. The interferometer can be calibrated by means of sources of light of known wavelength, and if desired a marker pulse generator 39 can be used for driving a second channel of the recorder 38 to record a series of reference marks corresponding to predetermined wavelengths. The marker pulse generator 39 is controlled by signals derived from the angular oscillation means 32, said signals being related to the angle of the wedge 28 relative to the incident light.

Although reference has been made to angularly oscillating the wedge 28, it will be understood that the mask 29 could be oscillated instead. The former arrangement is preferred, however, as the fringes remain in focus in the plane of the mask 29 when the wedge 28 is oscillated, provided that the oscillation occurs about the vertex of the wedge and the vertex remains in the plane of the mask 29 during oscillation.

In the embodiment of FIG. 4, the fringes are vibrated relative to the lines of the mask by angularly oscillating an optical plate positioned in the path of the light between the wedge and the mask. Referring to FIG. 4, incident light is collected by a telescope consisting of an objective lens 40, a stop 41 and a secondary lens 42. The light which has passed through the lens 42 is collimated and is directed towards a wedge formed by optical plates 43 and 44. The light strikes the plate 43 at an angle of about 45°, and is reflected towards a mask 45, which is normal to the path of the reflected light. The mask 45 is similar to the mask 16 described above. It has been found convenient to separate the plates 43 and 44 without changing the angle between them so that the apex of the wedge (the apex is now virtual) is approximately 1" from the convergent ends of the plates 43 and 44. This arrangement has the advantage of eliminating undesirable high amplitude white light fringes. The fringes are vibrated by means of a thick quartz plate 46 which is positioned in the path of the reflected light between the wedge and the mask 45. The plate 46 has optically flat and parallel opposed faces, and is positioned at right angles to the path of the reflected light. The plate 46 is angularly oscillated about an axis 47 by any convenient means, such as a conventional torsional chopper motor, and as it is angularly oscillated the fringes are swept back and forth across the lines of the mask 45. After passing through the mask 45, the light is focussed by a lens 48 onto a photodetector 49. The output of the photodetector 49 may be analyzed in the manner described above in connection with the embodiment shown in FIG. 1. An additional photodetector 50 is provided for receiving light which has been refracted through the wedge.

The output of the photodetector 50 can be used as a reference to enable cancellation of at least some of the noise present in the output of the photodetector 45 which is due to effects such as scintillation noise, turbulence, etc.

Figure 5:
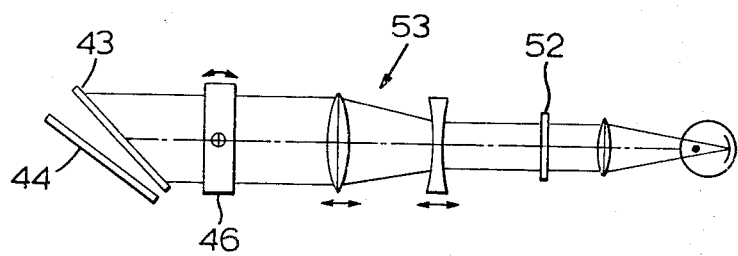
FIG. 5 is a diagrammatic view of an arrangement for measuring specific wavelengths.

Finally, the embodiment of FIG. 5 can be used for measuring the intensity of light at various wavelengths. As indicated above, when the incident light is reasonably monochromatic, the fringes are uniformly spaced and the spacing is a function of the wavelength. In order to measure the intensity of monochromatic lines (e.g. in flame spectra studies) the incident light is filtered by a premonochromator such as a conventional interference filter having a bandwidth of, for example, about 10–20 A. approximately centered about the wavelength of interest. The remainder of the interferometer is similar to the embodiment of FIG. 4 except that in this case the lines of mask 52 are uniformly spaced, the spacing defining a particular monochromatic wavelength, and a zoomar lens 53 is interposed in the path of the light between the wedge and mask. By changing the magnification of the zoomar lens 53, the spacing of the fringes at the mask 52 can be varied. When the magnification is such that the spacing of the fringes equals the spacing of the lines of the mask, correlation occurs, and the existence of correlation is indicated in the manner described above in connection with the embodiment of FIG. 1. As the magnification of the zoomar lens 53 is directly related to wavelength, the magnification scale of the zoomar lens 52 can be calibrated in terms of wavelength.

The invention has been described with particular reference to a wedge for producing fringes, because a wedge is comparatively simple to make, and produces fringes which are parallel and nearly straight. The fringes produced by the wedge are thus particularly suitable for correlation, as the fringes are very easily swept back and forth across the lines of the mask. However, it is contemplated that other interferometric, spatially dispersive devices might be used as well, as the Fabry-Perot interferometer, Newton's rings apparatus, the Lummer-Gercke interferometer, etc.

What I claim as my invention is:

1. In an interferometer having interferometric means for producing spatially dispersed interference fringes of predetermined order in light incident upon the interferometric means and a photodetector positioned to receive light containing said fringes, the improvement comprising:
   (a) a mask having a plurality of relatively opaque regions with transparent regions between them, said lines being correlative with a set of fringes which are formed when light of predetermined spectral content passes through the interferometric means, said mask being positioned in the path of the light between the interferometric means and the photodetector and said mask being positioned in a plane where said fringes are imaged,
   (b) means for cyclically varying the degree of correlation between the fringes and the regions of the mask at a rapid and constant rate of repetition between a first condition wherein the fringes correlate with the regions of the mask and a second condition wherein there is substantially less correlation than in the first condition, so that the intensity of the light passing through the mask is cyclically varied from one level at said first condition to another level at said second condition when said light of predetermined spectral content is present in the incident light, whereby the photodetector produces an output signal containing an alternating current component of constant frequency attributable to the existence of said light of predetermined spectral content in the incident light,
   (c) means coupled to the photodetector for amplifying said constant frequency alternating current signal separately from other components of said output signal, and
   (d) means coupled to said amplifying means for measuring the level of the amplified alternating current signal independently of other components in the output signal.

2. The invention claimed in claim 1 wherein said interferometric device is a wedge.

3. The invention claimed in claim 2 wherein the means for cyclically varying the degree of correlation includes means for transversely shifting the position of the lines of the mask relative to the position of the fringes or vice versa at a rapid and constant rate of repetition, so that in the said first correlation condition the lines of the mask correlate with said fringes and in said second correlation condition there is a slight relative transverse displacement between the lines of the mask and said fringes.

4. The invention claimed in claim 3 wherein said position shifting means is a rotatable optical plate positioned in the path of the light between the wedge and the mask, said plate having optically flat and parallel opposed faces, and means for angularly oscillating the optical plate.

5. The invention claimed in claim 3 wherein the amplitude of said transverse displacement is about one half the average peak to peak spacing of the fringes.

6. The invention claimed in claim 3 wherein the amplitude of said transverse displacement is about twice the peak to peak spacing of the fringes when said fringes are reasonably uniformly spaced.

7. The invention claimed in claim 3 wherein the interferometer further includes means for synchronously detecting the alternating current component of the output of the photodetector, and means for synchronizing said synchronously detecting means with said shifting means.

8. The invention claimed in claim 3 wherein the photodetector is a photomultiplier, and wherein means is provided for automatically adjusting the gain of the photomultiplier to maintain its direct current output at a substantially constant level.

9. The invention claimed in claim 3 wherein the spacing of the lines of the mask is uniform, and wherein a lens having variable magnification is positioned in the path of the light between the wedge and the mask so that the spacing of the fringes imaged at the mask can be made equal to the spacing of the lines of the mask.

10. The invention claimed in claim 5 wherein the interferometer further includes the means for synchronously detecting the alternating current component of the output of the photodetector, and means for synchronizing said synchronously detecting means with said shifting means.

11. The invention claimed in claim 6 wherein the interferometer further includes means for synchronously detecting the alternating current component of the output of the photodetector, and means for synchronizing said synchronously detecting means with said shifting means.

12. The invention claimed in claim 5 wherein the photodetector is a photomultiplier, and wherein means is provided for automatically adjusting the gain of the photomultiplier to maintain its direct current output at a substantially constant level.

13. The invention claimed in claim 6 wherein the photodetector is a photomultiplier, and wherein means is provided for automatically adjusting the gain of the photomultiplier to maintain its direct current output at a substantially constant level.

14. The invention claimed in claim 7 wherein the interferometer further includes an integrator operatively connected to the output of the synchronously detecting means, and means for displaying the output of the integrator.

15. An interferometer comprising:
   (a) a wedge for producing fringes of predetermined order in polychromatic light incident upon the wedge,
   (b) a mask having a plurality of relatively opaque narrow regions with narrow transparent regions between them, said opaque regions being uniformly spaced, said mask being positioned in a plane where said fringes are imaged,
   (c) means for varying the angle between the plane of the mask and the wedge at a predetermined angular rate so that at each angular position of the mask relative to the wedge, fringes produced by light of a specific wavelength correlate with the lines of the mask,
   (d) a photodetector positioned to receive light which has passed through the mask, said photodetector producing an output signal that is proportional in amplitude to the intensity of the light which is passed through the mask, and
   (e) means coupled to said photodetector for indicating the level of said output signal at each such angular position of the mask relative to the wedge.

References Cited

UNITED STATES PATENTS

| | | | |
|---|---|---|---|
| 3,377,912 | 4/1968 | Yates | 356—106 |
| 2,472,991 | 6/1949 | Sukumlyn | 356—111 |
| 2,848,921 | 8/1958 | Koulikovitch | 356—106 |

RONALD L. WIBERT, Primary Examiner

C. CLARK, Assistant Examiner